Nov. 9, 1954   W. R. BATEMAN ET AL   2,693,968
COIN-OPERATED BAGGAGE CART
Filed March 16, 1951   2 Sheets-Sheet 1
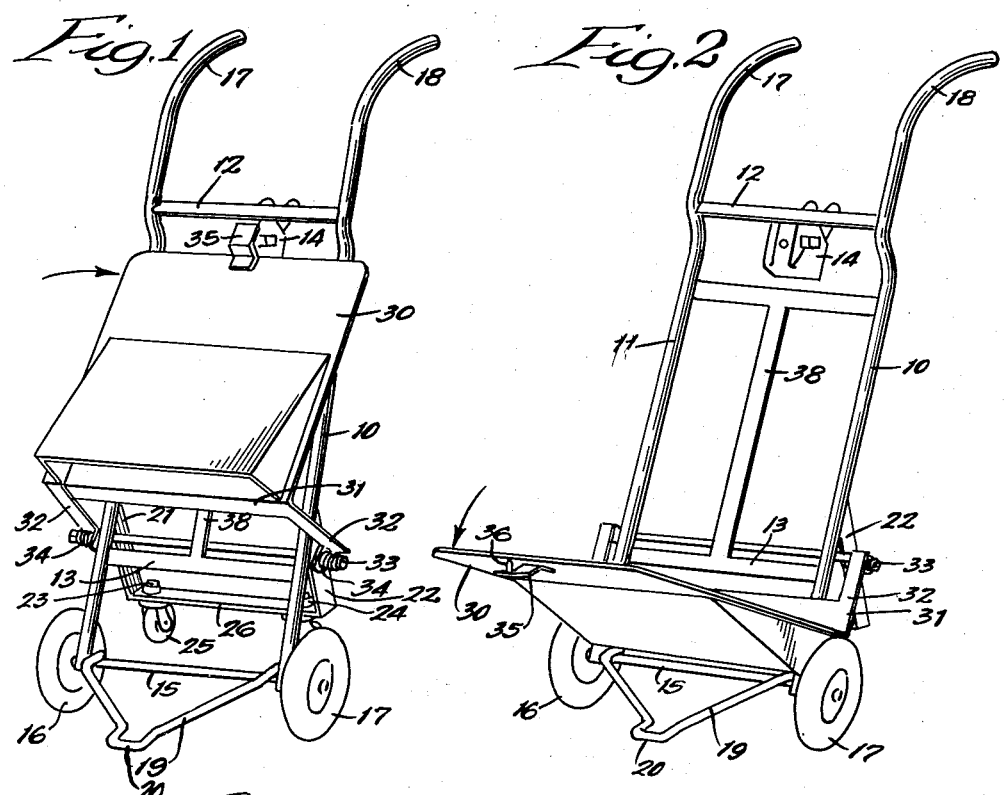
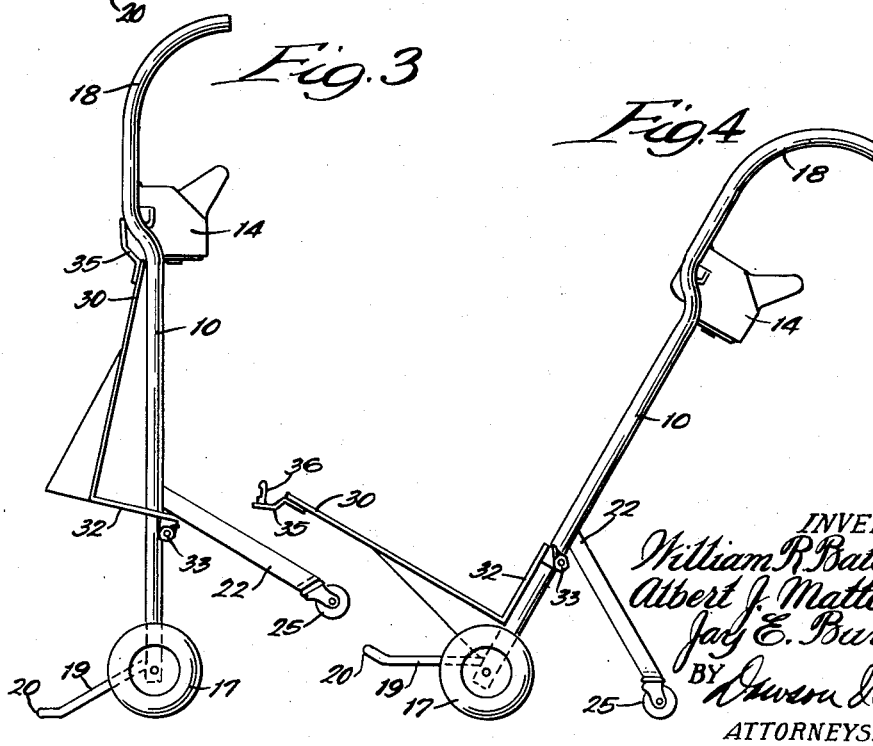
INVENTORS:
William R. Bateman,
Albert J. Matter and
Jay E. Burns,
BY
ATTORNEYS.

Nov. 9, 1954  W. R. BATEMAN ET AL  2,693,968
COIN-OPERATED BAGGAGE CART
Filed March 16, 1951  2 Sheets-Sheet 2
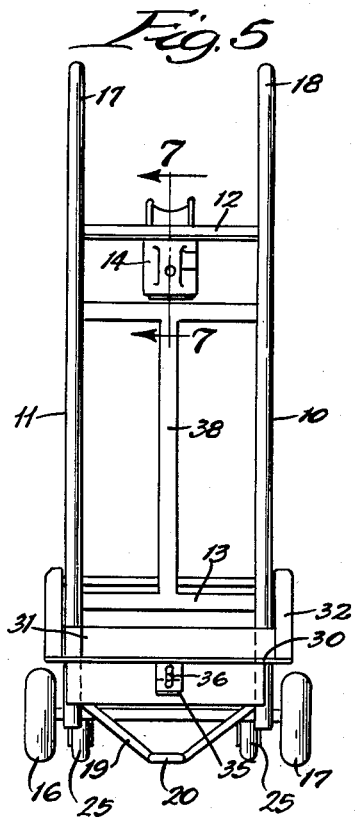
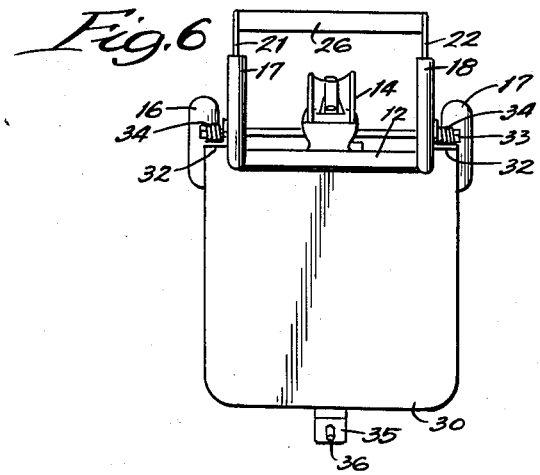
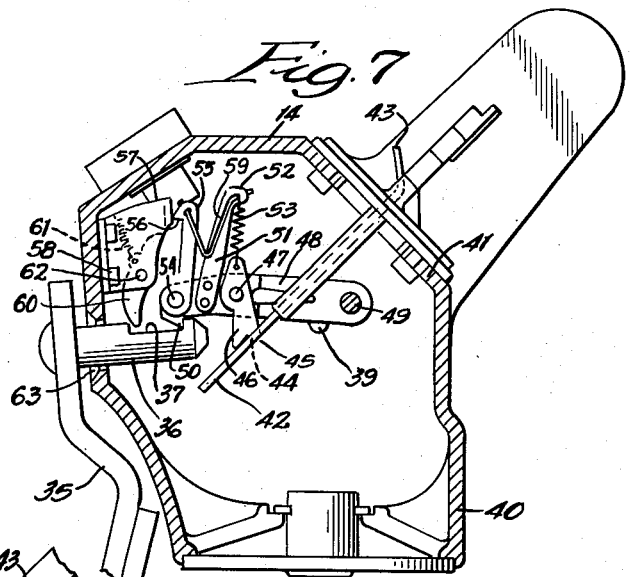
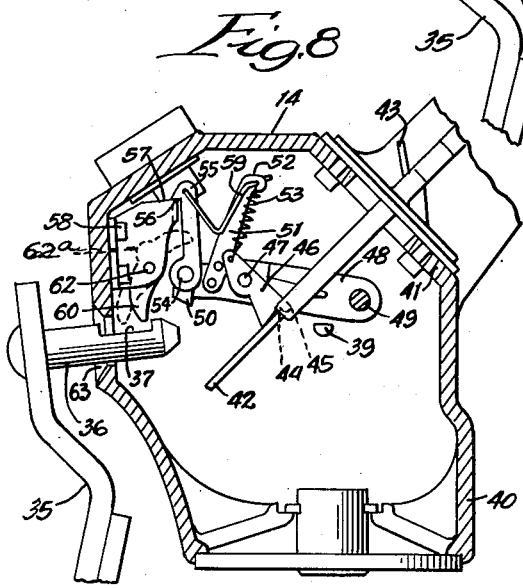
INVENTORS:
William R. Bateman,
Albert J. Matter and
Jay E. Burns,
BY Dawson & Ooms,
ATTORNEYS.

United States Patent Office 2,693,968
Patented Nov. 9, 1954

2,693,968

COIN-OPERATED BAGGAGE CART

William R. Bateman, Albert J. Matter, and Jay E. Burns, Chicago, Ill., assignors, by direct and mesne assignments, to U-Kart Incorporated, Chicago, Ill., a corporation of Illinois Application March 16, 1951, Serial No. 215,895

7 Claims. (Cl. 280—36)

This invention relates to a baggage cart and it is an object of this invention to produce a baggage cart or truck for individual use in transporting baggage from place to place. It is a related object to produce a cart of the type described which is coin controlled for conversion into condition for use and which when use has been completed automatically returns to an inoperative, collapsed condition.

Another object is to produce a coin controlled baggage cart which is easy to operate and constructed of relatively few simple parts assembled into a sturdy structure which can be moved while loaded from place to place with little effort and which, when in position of non-use, can be stacked in end to end relation so as to occupy minimum space and present an orderly and neat appearance.

A further object is to provide baggage carriers which can be made readily available for carrying heavy loads.

These and other objects and advantages of this invention will hereinafter appear and for purposes of illustration, but not of limitation, an embodiment of the invention is shown in the accompanying drawing in which:

Figure 1 is a perspective elevational view of a baggage cart embodying features of this invention with the parts in position of non-use;

Figure 2 is a perspective elevational view of the baggage cart shown in Figure 1 but with the parts in position of use;

Figure 3 is a side elevational view of the cart shown in Figure 1;

Figure 4 is a side elevational view of the cart shown in Figure 2;

Figure 5 is a front elevational view of the cart shown in Figure 2;

Figure 6 is a top plan view of the cart shown in Figure 2;

Figure 7 is a detailed sectional elevational view of a suitable latching mechanism with the parts shown in latching position, and Figure 8 is a sectional elevational view of the latching mechanism shown in Figure 7 with the parts shown in unlatched position.

As shown in the drawing, the concepts of this invention may be embodied in a hand truck having side frame members 10 and 11 connected by cross members 12 and 13 to provide a rigid structure supported on a transverse axle 15 having main wheels 16 and 17 journalled on the ends thereof. The upper end portions of the side frame members are curved inwardly by substantial amounts to provide handle bars 17 and 18 for easier manual operation. Instead, the rearward end portion may be connected by a handle bar or the like.

Rigid with the lower end portion of the side frame members 10 and 11 and joined with same in the vicinity of the transverse axle 15 is a toe member in the form of a rigid forwardly extending, V-shaped member 19 which is forwardly turned at the apex 20 to provide a rest adapted to lie flush with the flooring to provide a three-point support with the wheels when the frame members are stored in substantially vertical position.

Extending rearwardly from and fixed to the side frame members intermediate their ends are a pair of inwardly extending support bars 21 and 22 which mount casters 23 and 24 on the ends thereof and in which caster wheels 25 are journalled. The support bars are dimensioned and extend rearwardly in angular relation from the side frame members to dispose side frame members rearwardly at an incline ranging from 45–70° with the flooring when positioned to rest the caster wheels and main wheels thereon. It is preferred to arrange the support bars to provide an angular relation of about 60–70° with the floor line when the cart is tilted into position of use with the caster wheels and the main wheels resting upon the ground. The support arms may be braced by a cross piece 26 which in combination with the support bars 21 and 22 forms a U-shaped element formed of metal bars, tubing or other rigid material.

A platform 30 having a substantially perpendicularly upwardly extending back wall 31 is provided with a pair of arms 32 which extend beyond the ends of the back wall and are pivotally mounted on outwardly extending posts 33 fixed to the lower intermediate portion of the side frame members 10 and 11. The rack or platform 30 is constantly urged to rock in the clockwise direction about its pivot to fold upwardly by suitable resilient means such as coil springs 34 or torsion springs having one end anchored to the side frame members while the other is rigid with the rack arm 32.

It will be evident from the description that the rack or platform 30 can be swung downwardly about its pivot further to tension the spring force until the back wall 31 engages the front surfaces of the side frame members. When in that position, the platform will project forwardly therefrom at substantially right angles or slightly less to provide a platform upon which baggage or the like may be positioned. Generally the weight of the baggage will be sufficient to hold the rack in position of use. When in raised position, it will also be apparent that the carts may be nested so as to occupy minimum floor space merely by positioning the carts in end to end relation with the caster wheels 25 of one cart located between the main wheels of the adjacent cart and the like.

In the practice of this invention, means are provided for coin control to regulate the use of the baggage cart. For this purpose means, such as bracket 14, are provided for automatically latching the rack or platform when returned to collapsed position or for unlatching same when a proper coin has been deposited.

For this purpose, a plate 35 is fixed to the forward edge portion of the platform and projects forwardly from the center thereof with a lock pin 36 having a groove 37 in the upper wall fixed to the forwardly extending portion to extend substantially perpendicularly therefrom.

Fixed to an upper portion of the hand truck, such as to the cross member 12 intermediate the frame members 10 and 11, is a housing 40 having an inclined rear wall portion 41 through which a recessed coin receiving slide 42 extends at an angle, such as about 45°, with a pawl lever 46. The slide operates in a housing having a stop which prevents inward displacement of the slide unless actuated out of the path by the inserted coin. For purposes of actuation, the slide has a handle portion 43 on the end thereof and a rack in the housing engages in teeth in the slide responsive to spring force to prevent withdrawal of the slide until it has been advanced all the way. It will be understood that other well known and suitable coin controlled locking mechanism may be used. An opening 44 which may be the coin receiving opening is provided in a forward end portion of the slide for receiving a pawl projection 45 which extends downwardly from the lower edge of a pawl lever 46 pivoted intermediate its ends on pin 47 rigid with an intermediate portion of an elongate substantially horizontally disposed lock hook 48. The lock hook is pivoted at its rearward end upon pin 49 fixed to the housing and has a depending hook portion 50 at its forward end which seats within the groove 37 of lock pin 36 when in latching position. The lock hook is constantly urged into position for latching by suitable means, such as coil springs or a torsion spring operating about the pivot pin and a stop 39 extends from the housing to engage the arm in latching position.

Rigid with the lock hook and located forwardly of pivot pin 47 is an upright spring arm 51 having a rearwardly extending portion 52 to which one end of a coil spring 53 attaches. The other end of the coil spring is anchored onto the upper end portion of the pawl lever 46 for constantly urging same to be disposed in the vertical direction. Pivoted at its lower end upon pin 54 located in the forward end portion of the lock lever 48 is a holder 55 having a forwardly extending hook ledge 56 at its upper end for latching upon the upper edge of a trip lever bracket 57 secured as by bolts 58 to a wall in the upward and forward portion of the housing 40. Holder arm 55 is constantly urged to rock in the counterclockwise direction by V-shaped spring member 59 having one end anchored in the extension 52 while the other end is engaged in an opening provided in the upper end portion of the holder 55. Pivoted intermediate its ends onto the bracket 57 is a trip lever 60 which is constantly urged to neutral position for turning movement in either direction by a spring member 61 anchored at one end onto an ear 62ª extending from the forward edge portion of the lever above the pivot 62 and at the other end to the upper rear wall portion of the bracket. When in normal position of adjustment, the lower edge portion of the trip lever lies in the path of the lock pin so as to be engaged thereby in the rocking movement in the clockwise direction as the pin is unlatched and withdrawn from the housing to lower the platform into position of use.

The cart is usually stored in upright position with the forwardly extending shoe portion 20 resting upon the floor or ground and with the rack or platform in raised position so that the lock pin 36 is inserted through opening 63 in the forward wall of the housing 40 and latched therein by the hook portion 50 extending downwardly from the forward end of the lock hook arm 48.

When it is desired to make use of the baggage carrier, a coin is inserted in the slide lever recess so that the slide 42 can be pushed inwardly to the full extent of its forward movement. When in this position, the coin falls through into a coin box and pawl 45 enters opening 44 in the slide 42. As the slide is then drawn outwardly and upwardly along the angle of its incline, the pawl lever is caused to rise in the upward direction while turning in the counterclockwise direction about its pivot until pawl 45 leaves opening 44.

The movement of the pawl lever causes the lock hook arm 48 to swing about its pivot in the upward direction sufficiently to raise the hook end 50 from within the groove 37 and to push the hooking ledge 56 of the holder arm 55 above the edge of the bracket 57 to be forced forwardly into latching engagement therewith by spring 59.

Thus the lock pin 36 is free to be moved out of the housing so as to enable the platform to be rocked downwardly into position of use. As the hook pin 36 is withdrawn, the lower edge portion of the trip lever 60 is engaged and rocked sufficiently in the clockwise direction to be engaged by the upper end of the trip lever and displaced rearwardly to unseat the hook 56 from the upper edge of the bracket 57 whereby all of the latching parts return to their original position of adjustment. When the platform is later folded up to unusable position and the lock pin 36 enters the opening 63, the hook 50 on the end of lock hook arm 48 will be cammed upwardly a short distance by the tapered nose of the pin 36 until the hook enters the groove 37 to prevent retraction of the pin until the hook is again raised by operation of the coin controlled slide.

By way of further utility, it will be apparent from the description that the four-point rest provided by the described cart permits one cart to be joined with others in end to end relation and form a train of carts capable of movement together.

It will be understood that changes may be made in the details of construction, arrangement and operation without departing from the spirit of the invention, especially as defined in the following claims.

We claim:

1. In a baggage cart having a truck frame having two laterally spaced parallel arms interconnected by cross arms mounted upon wheels, an elongate platform dimensioned to have a width corresponding to that between the spaced frame arms and pivotally mounted on the frame adjacent the lower end portion of the spaced parallel arms for rocking movement between raised position wherein the platform is folded up to rest against the upper portion of the spaced arms and lowered position of use wherein the platform extends substantially perpendicularly from the lower end of the frame, means forming a part of the platform and extending substantially perpendicular from the platform for engaging the frame and bracing the platform when lowered to position of use, means constantly urging the platform towards its raised position of adjustment, and coin controlled locking mechanism for automatically securing the platform when actuated to raised position of adjustment and for unlatching same upon insertion of a coin to permit rocking movement of the platform to position of use.

2. In a baggage cart having a truck frame having two laterally spaced parallel arms interconnected by cross arms mounted upon wheels, an elongate platform pivotally mounted upon the frame adjacent the lower end portion of the spaced parallel arms for rocking movement between raised position wherein the platform is folded up to rest against the upper portion of the spaced arms and lowered position of use wherein the platform extends substantially perpendicularly from the lower end of the frame, means including an upright portion forming a part of the platform and extending substantially perpendicular therefrom for engaging the frame and bracing the platform when lowered to position of use and means pivotally mounting said upright portion at its end onto the frame member for rocking movement of the platform between collapsible position and position of use, means constantly urging the platform towards its raised position of adjustment, support arms extending rearwardly from the frame and having caster wheels on the ends thereof positioned to dispose the truck frame at a rearward incline when resting upon the caster and main wheels.

3. In a baggage cart having a truck frame having two laterally spaced parallel arms interconnected by cross arms mounted upon main wheels, an elongate platform pivotally mounted upon the frame adjacent the lower end portion of the spaced parallel arms for rocking movement between raised position wherein the platform is folded up to rest against the upper portion of the spaced arms and lowered position of use wherein the platform extends substantially perpendicularly from the lower end of the frame, means forming a part of the platform for engaging the frame and bracing the platform when lowered to position of use, support arms extending rearwardly and inwardly from an intermediate portion of the frame and having caster wheels on the ends thereof to dispose the frame at an angle between 45 and 70 degrees with the horizontal when resting upon the caster and main wheels, and coin controlled latching means for automatically securing the platform in raised position and for releasing same to be rocked in position of use upon insertion of a coin.

4. In a baggage cart having a truck frame having two laterally spaced parallel arms interconnected by cross arms mounted upon wheels, an elongate platform dimensioned to have a width corresponding to that between the spaced frame arms and having arms extending substantially perpendicular from the rearward edge thereof, means pivotally mounting the arms upon intermediate portions of the truck frame to permit rocking movement of the platform between raised position wherein the platform is folded up to rest against the upper portion of the spaced arms and lowered position of use wherein the platform extends substantially perpendicular from the lower end of the frame, spring means anchored at one end to the frame and at the other end to the arms for urging the platform to rock about its pivot towards raised position, and means supporting caster wheels in spaced relation with the main wheels to dispose the truck frame at an incline of about 45 to 70 degrees with the horizontal when resting upon the caster and main wheels, and coin controlled latching means for automatically securing the platform in raised position and for releasing same for rocking movement in position of use upon insertion of a coin.

5. A baggage cart as claimed in claim 4 in which the platform has a substantially vertically extending back wall which rests upon the frame and braces the platform when lowered to position of use and from which the pivotally mounted arms extend.

6. A baggage cart as claimed in claim 1 in which the latching means comprises a grooved lock pin on the end of the platform and a latch arm normally in position to engage the lock pin, means for actuating said latch arm from the path of said lock pin, and means for returning said latch arm to latching position responsive to withdrawal of the lock pin.

7. A baggage cart as claimed in claim 1 in which the latching mechanism comprises a grooved pin fixed to extend from the end of the platform, a latch arm normally in position to engage the grooved pin when the platform is rocked to raised position, means for actuating said latch arm from the path of said grooved pin, means responsive to removal of the latching arm from latching position for holding same out of the path of the grooved pin, and means for rendering said latter means ineffective responsive to movement of the grooved pin upon lowering the platform to position of use to return the latch arm to latching position.

References Cited in the file of this patent

UNITED STATES PATENTS

| Number | Name | Date |
|---|---|---|
| 817,779 | Hughes et al. | Apr. 17, 1906 |
| 1,436,173 | Hoxie | Nov. 21, 1922 |
| 1,484,864 | Bompart | Feb. 26, 1924 |
| 1,555,197 | Fritz | Sept. 29, 1925 |
| 2,590,048 | Sides | Mar. 18, 1952 |
| 2,605,117 | Hooz et al. | July 29, 1952 |